(12) United States Patent
Mukherjee

(10) Patent No.: US 11,631,031 B2
(45) Date of Patent: Apr. 18, 2023

(54) AUTOMATED MODEL GENERATION PLATFORM FOR RECURSIVE MODEL BUILDING

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 504 days.

(21) Appl. No.: 16/795,852

(22) Filed: Feb. 20, 2020

(65) Prior Publication Data
US 2021/0264311 A1   Aug. 26, 2021

(51) Int. Cl.
G06Q 30/00     (2023.01)
G06N 20/00     (2019.01)
G06Q 30/0601   (2023.01)

(52) U.S. Cl.
CPC ......... *G06N 20/00* (2019.01); *G06Q 30/0601* (2013.01)

(58) Field of Classification Search
CPC ..................................... G06N 20/00
USPC ........... 706/12, 1.1, 20, 16, 25, 45; 704/232, 704/260
See application file for complete search history.

(56) References Cited

U.S. PATENT DOCUMENTS

| | | |
|---|---|---|
| 7,752,208 B2 | 7/2010 | Amitay et al. |
| 8,180,717 B2 | 5/2012 | King et al. |
| 8,660,975 B2 | 2/2014 | Gionis et al. |
| 9,152,695 B2 | 10/2015 | Tibrewal et al. |
| 9,189,538 B2 | 11/2015 | King et al. |
| 9,529,892 B2 | 12/2016 | Tibrewal et al. |
| 9,547,877 B2 | 1/2017 | Chung et al. |
| 9,576,326 B2 | 2/2017 | Chung et al. |
| 9,582,836 B2 | 2/2017 | Chung et al. |
| 9,684,910 B1 | 6/2017 | Ayars et al. |

(Continued)

OTHER PUBLICATIONS

ProQuestDialogNPL Search History.*

(Continued)

*Primary Examiner* — John H. Holly
(74) *Attorney, Agent, or Firm* — Banner & Witcoff, Ltd.

(57) ABSTRACT

Aspects of the disclosure relate to an automated model generation platform for recursive model building. A computing platform may receive a request for automated machine learning model building, and may identify a service offering corresponding to the request. Based on the identified service offering and using machine learning algorithms, the computing platform may select machine learning models and a corresponding sequence of model application (e.g., machine learning model information). The computing platform may store the machine learning model information along with a corresponding indication of the identified service offering. The computing platform may receive a request for model information corresponding to a service access request, and may identify that the service access request corresponds to a problem within the identified service offering. In response, the computing platform may send the machine learning model information, which may cause the enterprise service host system to generate a service output interface.

20 Claims, 10 Drawing Sheets

(56) References Cited

U.S. PATENT DOCUMENTS

| | | | |
|---|---|---|---|
| 9,842,000 | B2 | 12/2017 | Bishop et al. |
| 9,946,593 | B2 | 4/2018 | Bishop et al. |
| 9,965,330 | B2 | 5/2018 | Bishop et al. |
| 10,146,592 | B2 | 12/2018 | Bishop et al. |
| 10,268,753 | B2 | 4/2019 | Bar-Or et al. |
| 10,275,502 | B2 | 4/2019 | Hubmann et al. |
| 10,291,627 | B2 | 5/2019 | Gleichauf |
| 10,310,760 | B1 | 6/2019 | Dreier et al. |
| 10,324,773 | B2 | 6/2019 | Wing et al. |
| 10,394,532 | B2 | 8/2019 | Bar-Or et al. |
| 10,402,502 | B2 | 9/2019 | Elassaad |
| 10,437,635 | B2 | 10/2019 | Layman et al. |
| 10,454,498 | B1 | 10/2019 | Mao |
| 10,474,725 | B2 | 11/2019 | Grover et al. |
| 10,496,926 | B2 | 12/2019 | Florissi et al. |
| 10,515,097 | B2 | 12/2019 | Florissi et al. |
| 10,521,482 | B2 | 12/2019 | Zhang et al. |
| 2018/0012145 | A1 | 1/2018 | Maurya et al. |
| 2018/0285777 | A1* | 10/2018 | Li .................... G06N 20/00 |
| 2022/0198336 | A1* | 6/2022 | Puente Pestaña ...... G06N 20/00 |

OTHER PUBLICATIONS

"Boosting (machine learning)" Wikipedia https://en.wikipedia.org/wiki/Boosting_(machine_learning) website visited Feb. 19, 2020, pp. 1-5.
"Bootstrap aggregating" Wikipedia https://en.wikipedia.org/wiki/Bootstrap_aggregating, website visited Feb. 19, 2020, pp. 1-2.
"Random forest" Wikipedia https://en.wikipedia.org/wiki/Random_forest, website visited Feb. 19, 2020, pp. 1-7.

* cited by examiner

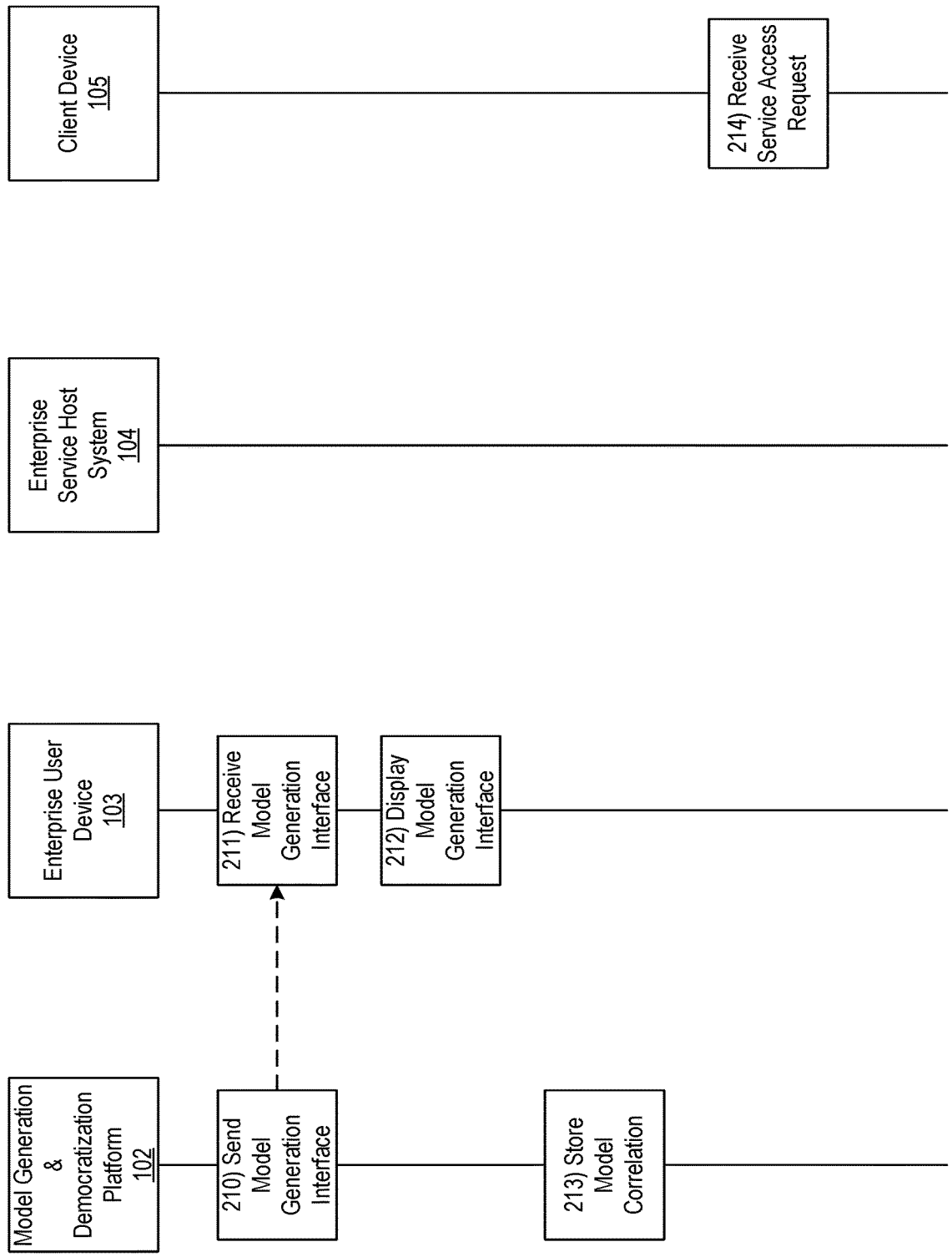

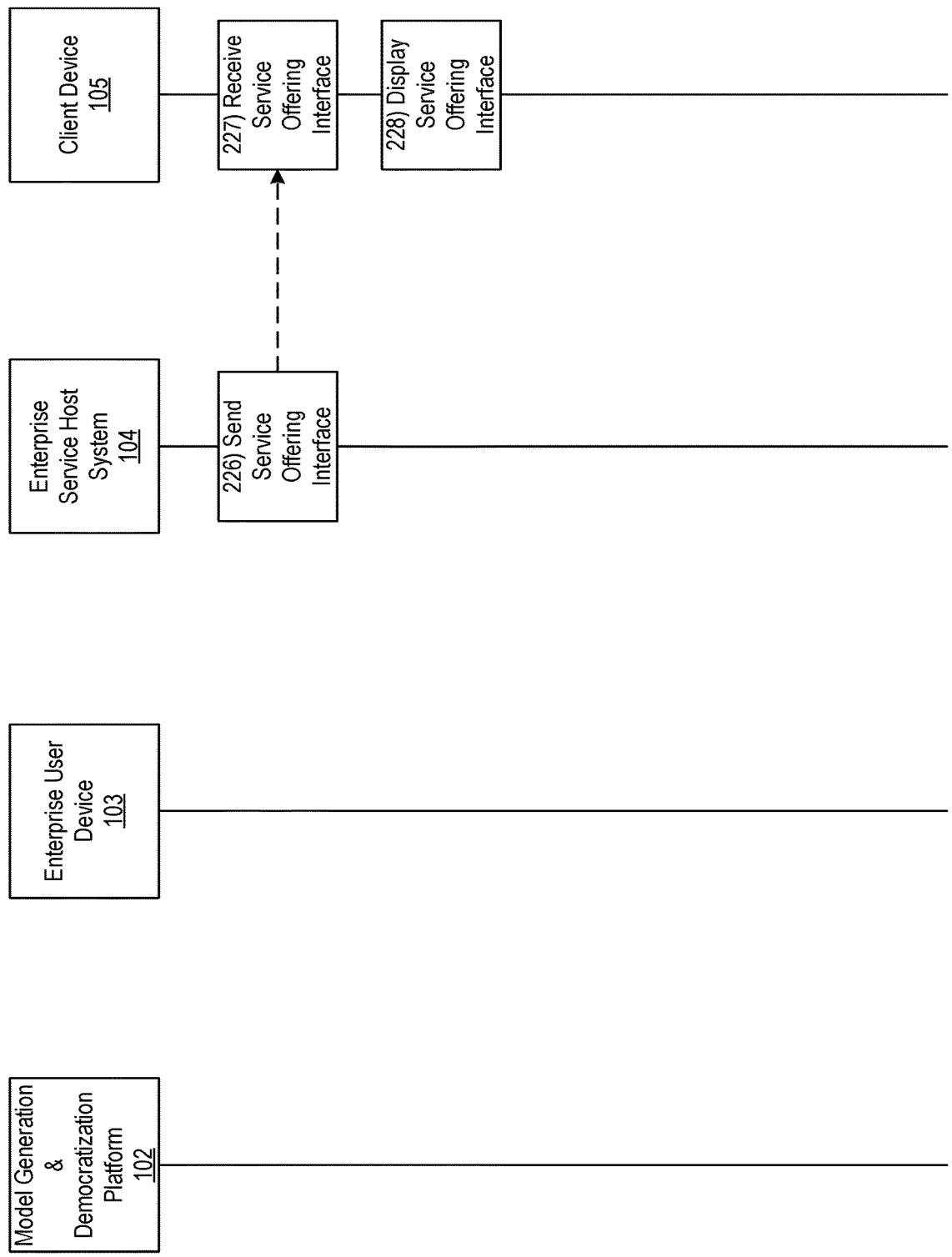

305

Model Generation Interface

The models listed below should be applied in the specified order for optimal results:

1) Boosting

2) Bagging

3) Random Forest

Service Offering Interface

The following content has been selected for you based on your viewing history:

| Movie #1 | Movie #2 | Movie #3 | Movie #4 |

FIG. 4

AUTOMATED MODEL GENERATION PLATFORM FOR RECURSIVE MODEL BUILDING

BACKGROUND

Aspects of the disclosure relate to automated model generation platforms. In particular, one or more aspects of the disclosure relate to computing platforms that implement machine learning in model building.

In some cases, enterprise organizations such as financial institutions may implement machine learning models to provide various user interfaces. In some instances, these machine learning models may be identified by using brute force methods and/or by using a monolithic system. In some instances, however, such brute force methods may be computationally expensive, and such monolithic systems may be difficult and/or expensive to maintain (e.g., because changes to any portion of the code may affect the entire system). These deficiencies may result in sub-optimal application of machine learning models across a wide variety of service lines (e.g., models may be over fit, error prone, or the like). As a result, it may be difficult for enterprise organizations to exploit the full potential of machine learning applications.

SUMMARY

Aspects of the disclosure provide effective, efficient, scalable, and convenient technical solutions that address and overcome the technical problems associated with machine learning model selection. Some aspects of the disclosure are particularly effective in certain use cases, such as in optimizing streaming content services, financial services, online shopping services, or the like. For example, some aspects of the disclosure provide techniques that may enable computing devices to automatically generate correlations between a given problem domain (e.g., one or more particular service offerings) and a most effective selection and sequence of machine learning models corresponding to the particular problem domain. The computing devices may use these correlations to generate optimal solutions and responses (e.g., not over fit, under fit, error prone, or the like) to various service access requests. In doing so, various technical advantages may be realized. For example, one technical advantage of using machine learning itself to select combinations of machine learning models is that a significant amount of historical data may be analyzed that might not otherwise be taken into account. Accordingly, by implementing machine learning, one or more of the systems described herein may ensure that optimal model combinations, which might not otherwise be identified, may be selected. Such systems may further ensure that more accurate results may be output (e.g., both in terms of model selection and in responding to service requests (e.g., fitting data, error rates, or the like)). Furthermore, another technical benefit is conservation of processing resources. For example, rather than merely applying brute force methods and analyzing every possible model and sequence combination, the one or more systems described herein may make informed and/or intelligent decisions (e.g., by analyzing historic data and applying machine learning algorithms) that may avoid such brute force processing and ultimately conserve computing resources. As yet another technical advantage, one or more of the systems and methods described herein may be implemented using a plurality of microservices, which may be distinctly implemented (e.g., each for a particular problem domain, machine learning model, or the like). As such, modifications to scripts at each of the microservices may be relatively less computationally expensive, as other microservices may continue to operate during maintenance or downtime for a single microservice. Furthermore, errors and/or other problems at the single microservice might not affect the remaining microservices (e.g., in contrast to a single script which may affected by any errors in its entirety).

In accordance with one or more embodiments of the disclosure, a computing platform comprising at least one processor, a communication interface, and memory storing computer-readable instructions may receive a request for automated machine learning model building. Next, the computing platform may identify a service offering corresponding to the automated machine learning model building request. Based on the identified service offering and using one or more machine learning algorithms, the computing platform may select one or more machine learning models and a corresponding sequence of model application, which may result in machine learning model information. Subsequently, the computing platform may store the machine learning model information along with a corresponding indication of the identified service offering. The computing platform may receive, from an enterprise service host system, a request for model information corresponding to a service access request. In addition, the computing platform may identify that the service access request corresponds to a problem within the identified service offering. In response to identifying that the service access request corresponds to the problem within the identified service offering, the computing platform may send, to the enterprise service host system, the machine learning model information, which may cause the enterprise service host system to generate a service output interface by applying the machine learning model information to the problem associated with the service access request.

In one or more instances, the computing platform may select the one or more machine learning models and the corresponding sequence of model application by selecting the one or more machine learning models and the corresponding sequence of model application based on model features include one or more of: key words associated with the problem, topics associated with the problem, a volume of data associated with the problem, set of features similarity between models, geographic and spatial co-location of the data associated with the problem, or time and coincidentally of the data associated with the problem. In one or more instances, the computing platform may identify the model features using an unsupervised learning process, and may select the one or more machine learning models and the corresponding sequence of model application by generating the one or more machine learning models using a supervised learning process.

In one or more instances, the computing platform may identify, based on the service offering, one or more model metrics. In these instances, the metrics may be one or more of a maximum error rate, a bias metric, a maximum false positive rate, or a maximum false negative rate. In these instances, the computing platform may select the one or more machine learning models and the corresponding sequence of model application based on the one or more model metrics.

In one or more instances, the computing platform may select the one or more machine learning models by selecting one or more of: least square regression, ridge regression, Bayesian method, decision tree, bagging, boosting, random forest, neural network, support vector model, or hidden Markov model. In one or more instances, the identified service offering may be one of: an online shopping service, a video streaming and selection service, a music streaming and selection service, a life science service, a medical service, or a financial service.

In one or more instances, the computing platform may receive additional data associated with the service offering. Based on the additional data, the computing platform may dynamically update, based on the additional data, the one or more machine learning models and the corresponding sequence of model application, resulting in updated machine learning model information. The computing platform may replace the stored machine learning model information with the updated machine learning model information, which may be stored along with the corresponding indication of the identified service offering.

In one or more instances, the computing platform may host a first microservice associated with a first one of the one or more machine learning models, where selecting the one or more machine learning models and the corresponding sequence of model application, is performed using the first microservice. In these instances, another computing platform may be configured to host a second microservice, associated with a second one of the one or more machine learning models, and may use the second microservice to select one or more additional machine learning models and a corresponding application sequence for the one or more additional machine learning models.

In one or more instances, the first microservice may be implemented in a first programming language and the second microservice may be implemented in a second programming language. In one or more instances, the first microservice may remain deployed during modification of the second microservice and the modification of the second microservice might not affect the first microservice. In one or more instances, the computing platform may identify the service offering corresponding to the automated machine learning model building request by identifying a problem domain corresponding to a machine learning model democratization request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing an automated model generation platform for recursive model building in accordance with one or more example embodiments;

FIGS. 3 and 4 depict illustrative user interfaces for implementing an automated model generation platform for recursive model building in accordance with one or more example embodiments.

DETAILED DESCRIPTION

Figure 1A:
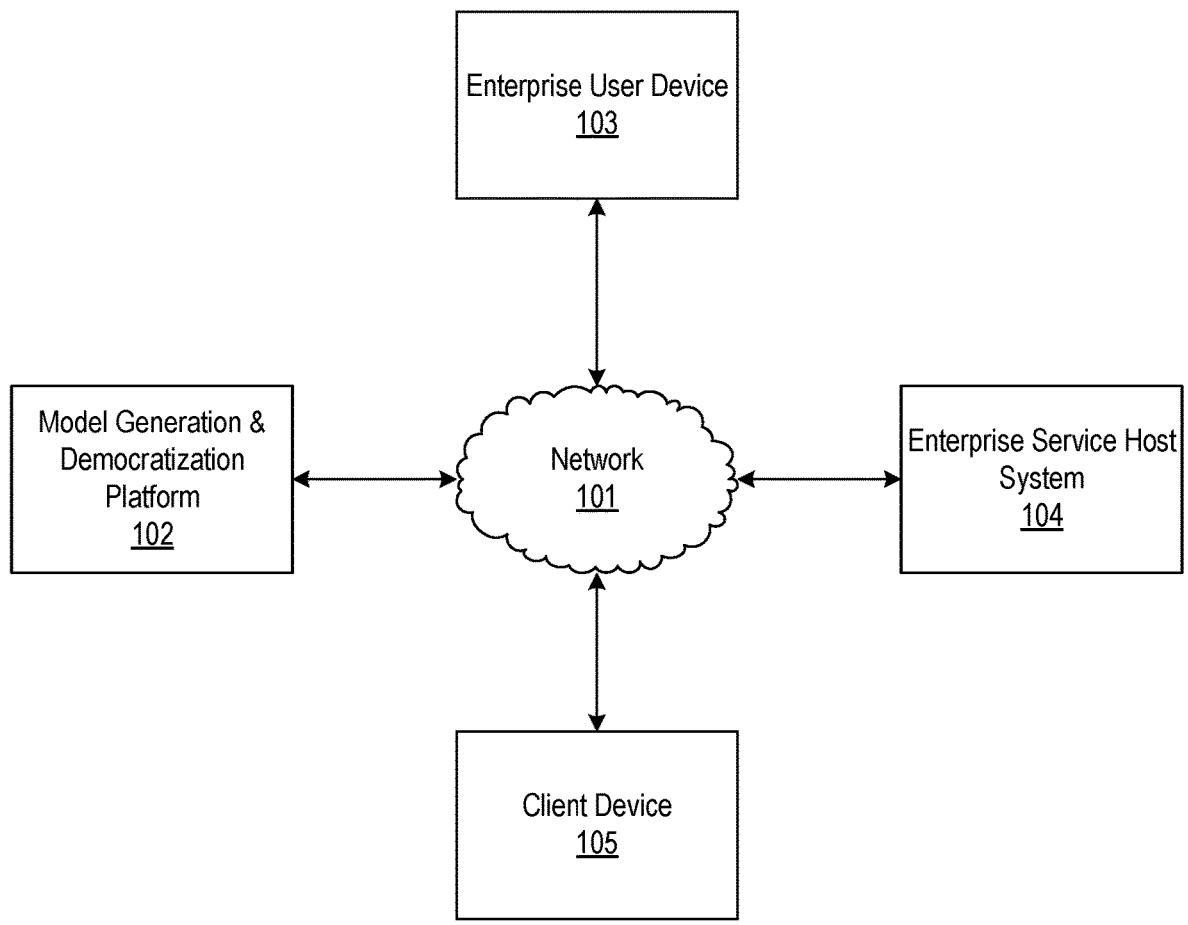
FIGS. 1A-1B depict an illustrative computing environment for implementing an automated model generation platform for recursive model building in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively build and select machine learning models that may be used to fulfill various service access requests. For example, model building for machine learning, in the traditional sense, may be performed through significant efforts and skills from data engineers. Such human resources are in high demand, and might not always be readily available. Democratization for machine learning is a term that is being used to define recent attempts to mechanize generation of machine learning models. In doing so, the goal is to minimize the amount of human resources necessary for such generation.

Machine learning is a collection of statistical methods in the area of computer science that use sets of historical data to predict future outcomes. In some instances, machine learning algorithms may build a mathematical model based on sample data, known as training data, in order to make predictions or decisions without being explicitly programmed to perform a particular task. Machine learning algorithms may be used in a wide variety of applications, such as email filtering, computer vision (e.g., face recognition, or the like), or the like, where it may be difficult or infeasible to develop a conventional algorithm for effectively performing a task. Machine learning is closely related to computational statistics, which focuses on making predictions using computers. The study of mathematical optimization delivers methods, theory and application domains to the field of machine learning.

The predictability of the future outcome for machine learning depends on carefully building the model based on historical or training data. Otherwise, results of the machine learning may be error prone and the consequence of any decision made on those results may be disastrous or even catastrophic.

One of the main characteristics of the model building is to not only minimize the error on the training data, but also avoid over fitting of the model. For example, over fitting may result in significant error during testing and predictions. In some instances, however, these goals may be in conflict with each other and may need to be balanced very carefully.

Model building may be performed in several different steps, including data preparation (e.g., checking for veracity and validity of data and accounting for missing values), model building (e.g., actual model building or fitting the data), and model testing and verification (e.g., testing the model for predictability). In some instances, each of these above described steps may include several other steps and/or may be repeated several times before a final model is built and used for predicting future outcomes.

Some example model building techniques include least square regression, ridge regression, Bayesian method, decision tree, bagging, boosting, random forest, neural network, support vector model, hidden Markov model, or the like. Each of these techniques may in turn consist of several other steps. For example, a random forest may consist of several decision trees and each decision tree may be made of hidden Markov models.

Additional or alternative methods also may be used. For example, in using bias variance decomposition, a balance in a model may be created by adding some bias in the model to reduce variance and vice-versa. The least mean square regression reduces the bias to zero, but may, in some instance, add some high variation. On the other hand, the ridge regression may add some bias and try to create a tradeoff between bias and regression.

Additional or alternative parameters also may be optimized. For example, a receiver operating characteristic (ROC) curve may identify a ratio between true positive rate (TPR) and false positive rate (FPR) at different thresholds. In these instances, the TPR may be the sensitivity or recall, and the FPR may denote false alarms. In one or more instances, TPR may determine sensitivity of a binary classifier.

In some instances, regularization may help to solve the over fitting problem in machine learning. A simple model may be a poor generalization of data, whereas a complex model might not perform well with test data due to over fitting. Accordingly, it is important to choose a model that balances both simplicity and complexity. Regularization may help to choose preferred model complexity, so that the chosen model may be more effective in making predictions. In some instances, regularization may be performed by adding a penalty term to an objective function and controlling model complexity using that penalty term. This technique may be applied to many machine learning algorithms.

In some instances, final model building may comprise multiple iterations. For example, the final model should be qualified for several metrics including error, bias, and/or predictability (both in terms of false negative and false positive). Conventional methods of democratization, however, may use brute force methods, to generate machine learning models that iterate over all possible steps and then choose the best model based on certain input metrics. In some instances, these brute force methods may be computationally intensive and may only run efficiently on special purpose hardware. Some aspects of the disclosure address and overcome these problems by providing improved methods for such democratization.

To solve the technical deficiencies that may be present within conventional solutions, one or more of the systems and methods described herein provide a machine learning based method built over a micro server based architecture for automated machine learning model building for a given problem domain. In some instances, one or more of the methods described herein may be implemented in either a single step or recursively.

In one or more instances, the microservice architecture described herein provides a simple method to break up essential components of machine learning into smaller structures that may be picked and chosen independently for combining into a machine learning model for a given problem domain. As described herein, one or more machine learning methods may use available historic data for different problem domains and previously created models for the different problem domains to identify what combinations of models are most suitable for a given problem domain.

In one or more instances, the microservice architecture described herein may allow a system to be divided into a number of smaller, individual and independent services. In these instances, each service may be flexible, robust, composable, and complete, and may each run as an autonomous process and communicate with one another through application programming interfaces (APIs). In doing so, each microservice may be implemented in a different programming language on a different platform. Accordingly, almost any infrastructure may run in a container that holds services encapsulated for operations. In these instances, because the containers may be operated in parallel, the existing infrastructure may be easier to maintain.

In contrast to the microservice architecture described above, a monolithic architecture means that components of a given codebase are designed to all work together as one cohesive unit, sharing the same memory space. Accordingly, software build using a monolithic approach may be self-contained with interconnected and interdependent components. In these instances, if developers want to make any changes or updates to a monolith system, they must build and deploy the entire stack at once. Similarly, with regard to scalability, the entire system, not merely the modules in it, may be scaled together. Accordingly, in instances where the monolithic architecture is applied, it may be difficult to adopt a new technology stack, and in instances where a new platform or framework is to be included, the corresponding code must be rewritten in its entirety.

In contrast, the key principle of microservices is simplicity. In these instances, applications may become easier to build and maintain when they are split into a set of smaller composable fragments. In these instances, each microservice may include a separate chunk of code, which may make managing the overall code less cumbersome. For example, services may be implemented using different programming languages, database formats, software environments, or the like. Furthermore, in these instances, each microservice may be deployed, rebuilt, re-deployed, and managed independently. For example, if a microservice allocates too much memory or puts a heavy load on the processor, it may only affect the specified microservice (e.g., not the remaining microservices). Generally speaking, problems with a singles microservice might not influence the entire system and failure of individual microservices may be compensated for relatively quickly. As yet another technical advantage, by separating the code into different microservices, portions of code may each be put into production one by one (e.g., as opposed to all at the same time).

One or more of the systems and methods described herein describe a method of machine learning model building for machine learning in a given problem domain. For example, there are many websites that regularly publish machine learning challenges. In these instances, data engineers compete for these challenges and manually build models for better metrics. These models may subsequently be published for given problem domains. In addition, many organizations (e.g., financial institutions, or the like) may maintain internal repositories of machine learning models for various problem domains.

One or more of the systems and methods described herein use the above described historical data of different models for different problem domains to predict the most suitable model for a new problem domain. Implementation of the microservice based architecture may improve the process of method selection for automatic optimization and learning.

In one or more instances, to generate a predictive model for model selection, one or more of the systems and methods described herein describe using an initial unsupervised learning process to identify the best features and characteristics that affect the suitable model. In one or more instances, such features and characteristics may be chosen based on the features described below (though it should be understood that the model may include other features found suitable by the unsupervised learning). For example, the features may include key words and topics defining the problem (e.g., problems related to life science or medical domain may use different types of models than a business or finance domain), volume of data used in the model generation (e.g., every problem type may have a different size and there may be orders of differences in the data), intersection or commonality or similarity of set of features used for the types of models, geographic and spatial co-location of the data for a given type of model, time and coincidentally of data, or the like.

After the important features are determined using an unsupervised learning processes, a supervised learning process may be used for model building. In one or more instances, appropriate error and bias may be chosen in the machine learning model so that the data is neither over fitted nor under fitted. The model may iteratively be refined for the appropriate level of precision, recall, and/or other metrics of a machine learning model.

In some instances, the model may be further improved by combining several predictors by polling and calculating an average of all the predictors for model stability. Additionally or alternatively, the model may incorporate randomization techniques such as boosting, bagging, random forest, or the like. Additionally or alternatively, the model may be further improved by incorporating more recent data as it becomes available.

Accordingly, by performing the one or more methods described herein, one or more of the systems described herein may implement more efficient machine learning methods for selecting and building machine learning models. Furthermore, by implementing the microservice based architecture described above, one or more of the methods described herein may enable piecemeal editing of code, which may reduce downtime of the system as a whole (e.g., because other scripts may continue to run while a particular script is isolated for editing) and may reduce modeling errors (e.g., error inadvertently introduced into unintended portions of the code). In addition, by implementing one or more of the methods described herein in a recursive manner, the one or more systems described herein may increase accuracy of the machine learning models to provide a technical advantage over state of the art methods.

Figure 1B:
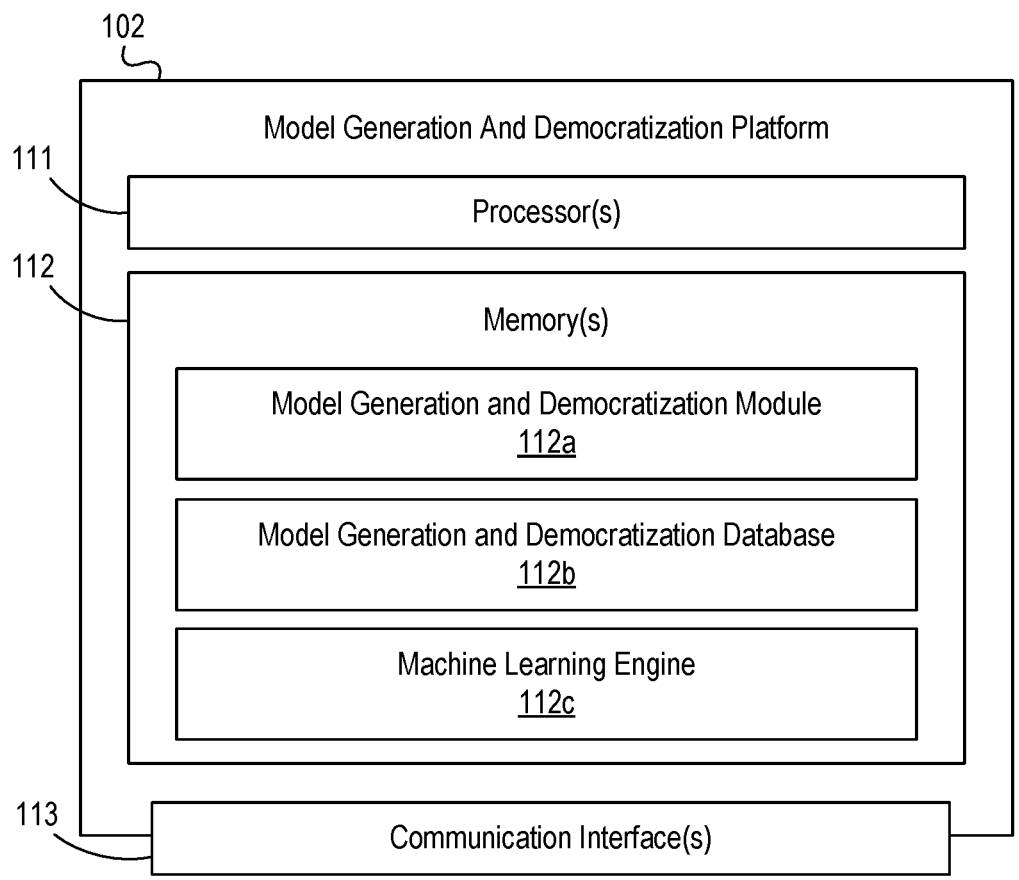

FIGS. 1A-1B depict an illustrative computing environment that implements an automated model generation platform for recursive model building in accordance with one or more example embodiments. Referring to FIG. 1A, computing environment 100 may include one or more computer systems. For example, computing environment 100 may include an automated model generation platform 102, an enterprise user device 103, an enterprise servicer host system 104, and a client device 105.

As described further below, automated model generation platform 102 may be a computer system that includes one or more computing devices (e.g., servers, server blades, or the like) and/or other computer components (e.g., processors, memories, communication interfaces) that may be used to generate and store machine learning model information for one or more problem domains (e.g., service offerings, or the like). In some instances, the automated model generation platform 102 may be maintained by an enterprise organization (e.g., an online shopping organization, a video/music selection and streaming organization, a medical institution, a life science research facility, a corporation, a financial institution, or the like) and may be configured to maintain a microservice for generation and storage of machine learning model information for the given problem domain (e.g., retail, financial services, video/music streaming, life science, medicine, finance, or the like). In some instances, the automated model generation platform 102 may be configured to receive requests from an enterprise user device (e.g., enterprise user device 103) to select machine learning models and corresponding model application sequences, and requests from an enterprise service host system 104 to provide machine learning model information associated with a specified problem in one or more problem domains for which the machine learning models and corresponding model application sequences were selected.

Enterprise user device 103 may be a desktop computer, laptop computer, tablet, mobile device, or the like, and may be used by an individual such as an employee of an enterprise organization (e.g., an online shopping organization, a video/music selection and streaming organization, a medical institution, a life science research facility, a corporation, a financial institution, or the like). For example, the enterprise user device 103 may request selection of one or more machine learning models and a corresponding model application sequence in response to receiving user input. In addition, enterprise user device 103 may be configured to cause display of and/or otherwise present one or more graphical user interfaces (e.g., interfaces that indicate the selected machine learning models and the corresponding model application sequence, or the like).

Enterprise service host system 104 may be a server, desktop computer, laptop computer, tablet, mobile device, or the like, that is configured to host a network associated with an enterprise organization (e.g., an online shopping organization, a video/music selection and streaming organization, a medical institution, a life science research facility, a corporation, a financial institution, or the like), and to respond to service requests from client devices (e.g., client device 105) requesting access to one or more services provided by the enterprise organization. For example, enterprise service host system 104 may be configured to generate streaming video/music interfaces that may be displayed at a client device (e.g., client device 105) and may include recommendations for a user of the client device 105 based on his or her viewing/listening history.

Client device 105 may be a desktop computer, laptop computer, tablet, mobile device, or the like, and may be used by an individual such as a customer or client of an enterprise organization (e.g., an online shopping organization, a video/music selection and streaming organization, a medical institution, a life science research facility, a corporation, a financial institution, or the like). For example, the client device 105 may send service access requests (e.g., requests to access an online store, a streaming service, a medical or life science portal, a corporate website, online banking portal, or the like) and may be configured to cause display of and/or otherwise present one or more graphical user interfaces (e.g., interfaces include content generated using the one or more machine learning models and corresponding model application sequence selected by the automated model generation platform 102, or the like).

Computing environment 100 also may include one or more networks, which may interconnect automated model generation platform 102, enterprise user device 103, enterprise service host system 104, client device 105, or the like. For example, computing environment 100 may include a network 101 (which may interconnect, e.g., automated model generation platform 102, enterprise user device 103, enterprise service host system 104, and client device 105).

In one or more arrangements, automated model generation platform 102, enterprise user device 103, enterprise service host system 104, and client device 105 may be any type of computing device capable of sending and/or receiving requests and processing the requests accordingly. For example, automated model generation platform 102, enterprise user device 103, enterprise service host system 104, client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of automated model generation platform 102, enterprise user device 103, enterprise service host system 104, and client device 105 may, in some instances, be special-purpose computing devices configured to perform specific functions.

Referring to FIG. 1B, automated model generation platform 102 may include one or more processors 111, memory 112, and communication interface 113. A data bus may interconnect processor 111, memory 112, and communication interface 113. Communication interface 113 may be a network interface configured to support communication between automated model generation platform 102 and one or more networks (e.g., network 101, or the like). Memory 112 may include one or more program modules having instructions that when executed by processor 111 cause automated model generation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of automated model generation platform 102 and/or by different computing devices that may form and/or otherwise make up automated model generation platform 102. For example, memory 112 may have, host, store, and/or include automated model generation module 112a, automated model generation database 112b, and a machine learning engine 112c.

Automated model generation module 112a may have instructions that direct and/or cause event management and validation platform 110 to execute advanced machine learning techniques related to model generation and model application sequence selection, as discussed in greater detail below. Automated model generation database 112b may store information used by automated model generation module 112a and/or automated model generation platform 102 in application of machine learning techniques related to model generation and model application sequence selection, and/or in performing other functions. Machine learning engine 112c may have instructions that direct and/or cause the automated model generation platform 102 to set, define, and/or iteratively refine optimization rules and/or other parameters used by the automated model generation platform 102 and/or other systems in computing environment 100.

Figure 2A:
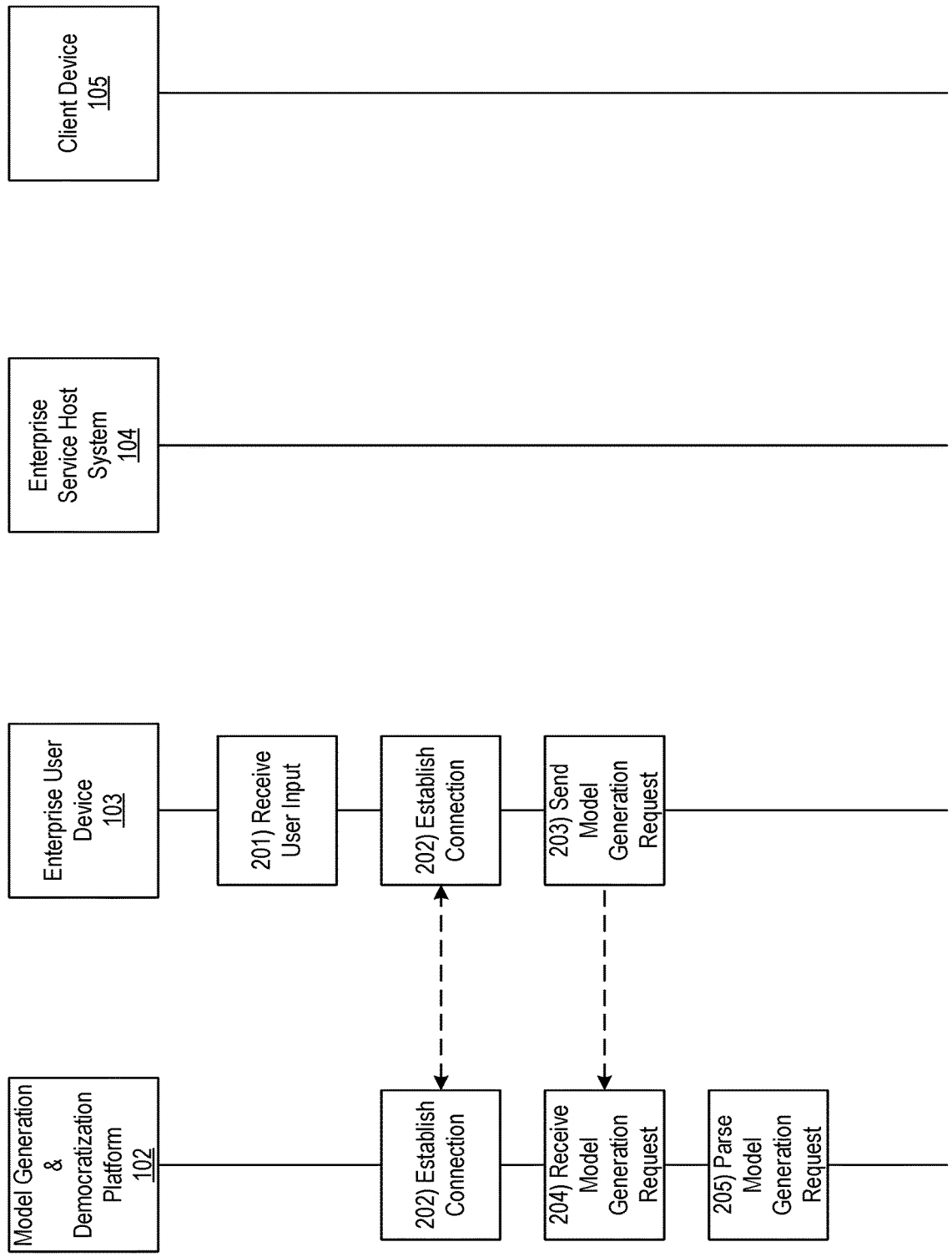

FIGS. 2A-2F depict an illustrative event sequence that implements an automated model generation platform for recursive model building in accordance with one or more example embodiments. Referring to FIG. 2A, at step 201, the enterprise user device 103 may receive user input (e.g., from an employee of an organization, or the like) requesting generation of a specified sequence of machine learning models for use in solving a particular problem. In some instances, in receiving the user input, the enterprise user device 103 may receive one or more key words and/or identifiable topics that may define the particular problem and its corresponding problem domain (which may be, e.g., a service offering such as online shopping, video/music selection and streaming, medical services, life science services, corporate services, financial services, or the like). In one or more instances, in receiving the user input, the enterprise user device 103 may receive user input indicating a particular problem associated with an enterprise organization with which a user of the enterprise user device is associated (e.g., an employee of a financial institution may indicate a financial problem, whereas an employee of a video streaming service may indicate a video streaming problem).

At step 202, the enterprise user device 103 may establish a connection with the automated model generation platform 102. In some instances, the enterprise user device 103 may establish a first wireless data connection with the automated model generation platform 102 to link the enterprise user device 103 to the automated model generation platform 102. In some instances, the enterprise user device 103 may identify whether there is already a connection established with the automated model generation platform 102. If there is already a connection established with the automated model generation platform 102, the enterprise user device 103 might not reestablish the connection. If there is not already a connection established with the automated model generation platform 102, however, enterprise user device 103 may establish the first wireless data connection as described herein.

At step 203, the enterprise user device 103 may generate, based on the user input received at step 201, a model generation request. In one or more instances, in generating the model generation request, the enterprise user device 103 may generate a request for a selection of one or more machine learning models and a corresponding sequence in which the selection of one or more machine learning models should be applied to solve the problem specified in the user input. In some instances, in generating the model generation request, the enterprise user device 103 may include the key words and/or topics identified in the user input at step 201.

Once the enterprise user device 103 generates the model generation request, it may send, share, or otherwise provide the model generation request to the automated model generation platform 102. In one or more instances, the enterprise user device 103 may send the model generation request to the automated model generation platform 102 while the first wireless data connection is established. In one or more instances, in sending the model generation request, the enterprise user device 103 may receive a request to automatically select one or more machine learning models and a corresponding application sequence.

At step 204, the automated model generation platform 102 may receive or otherwise access the model generation request, sent at step 203. In one or more instances, the automated model generation platform 102 may receive the model generation request via the communication interface 113 and while the first wireless data connection is established. In one or more instances, in receiving the model generation request, the automated model generation platform 102 may receive a request to automatically select one or more machine learning models and a corresponding application sequence.

At step 205, the automated model generation platform 102 may parse the model generation request, received at step 204, to identify one or more model features associated with the model generation request. In one or more instances, in parsing the model generation request, the automated model generation platform 102 may use an unsupervised learning process to identify features and characteristics of the model generation request that may affect subsequently selected models and/or application sequences. For example, the automated model generation platform 102 may parse the model generation request to identify key words and topics in the model generation request. In this example, by identifying the key words and topics in the model generation request, the automated model generation platform may identify a problem domain (e.g., a service offering such as online shopping, video/music selection and streaming, medical services, life science services, corporate services, financial services, or the like) and/or a particular specified problem within the problem domain (e.g., identify recommended video content based on a user's viewing history, identify targeted advertisements for an online shopping platform based on a user's purchase history and/or recently viewed items, or the like). In some instances, it may be important for the automated model generation platform 102 to identify the problem domain (e.g., service offering) to which the model generation request is directed, as different problem domains may benefit from implementation of different machine learning models (e.g., problems related to life science and/or the medical domain may be more accurately solved with different types of models than problems related to the business and/or finance domain). In these instances, the automated model generation platform 102 may identify key words and topics in the model generation request using one or more natural language processing algorithms, natural language understanding algorithms, or the like.

Additionally or alternatively, in parsing the model generation request, the automated model generation platform 102 may identify a data volume associated with the model generation request. For example, the automated model generation platform 102 may identify a first data volume for a first model generation request and a second data volume for a second model generation request (e.g., more data may be used in application of machine learning models to targeted advertising than to a streaming video service, or the like).

Additionally or alternatively, in parsing the model generation request, the automated model generation platform 102 may identify intersections, commonalities, similarities, or the like between features associated with the model generation request and other features. For example, in some instances, the automated model generation platform 102 may identify that certain features of a first domain associated with the model generation request are similar to features of a second domain associated with another model generation request (e.g., that certain features in a streaming video service request are similar to those in an online shopping service request, such as data volume used in machine learning analysis for each). Additionally or alternatively, in parsing the model generation request, the automated model generation platform may identify a geographic and spatial co-location, time, coincidentality, or the like of data for models associated with the model generation request.

Figure 2B:
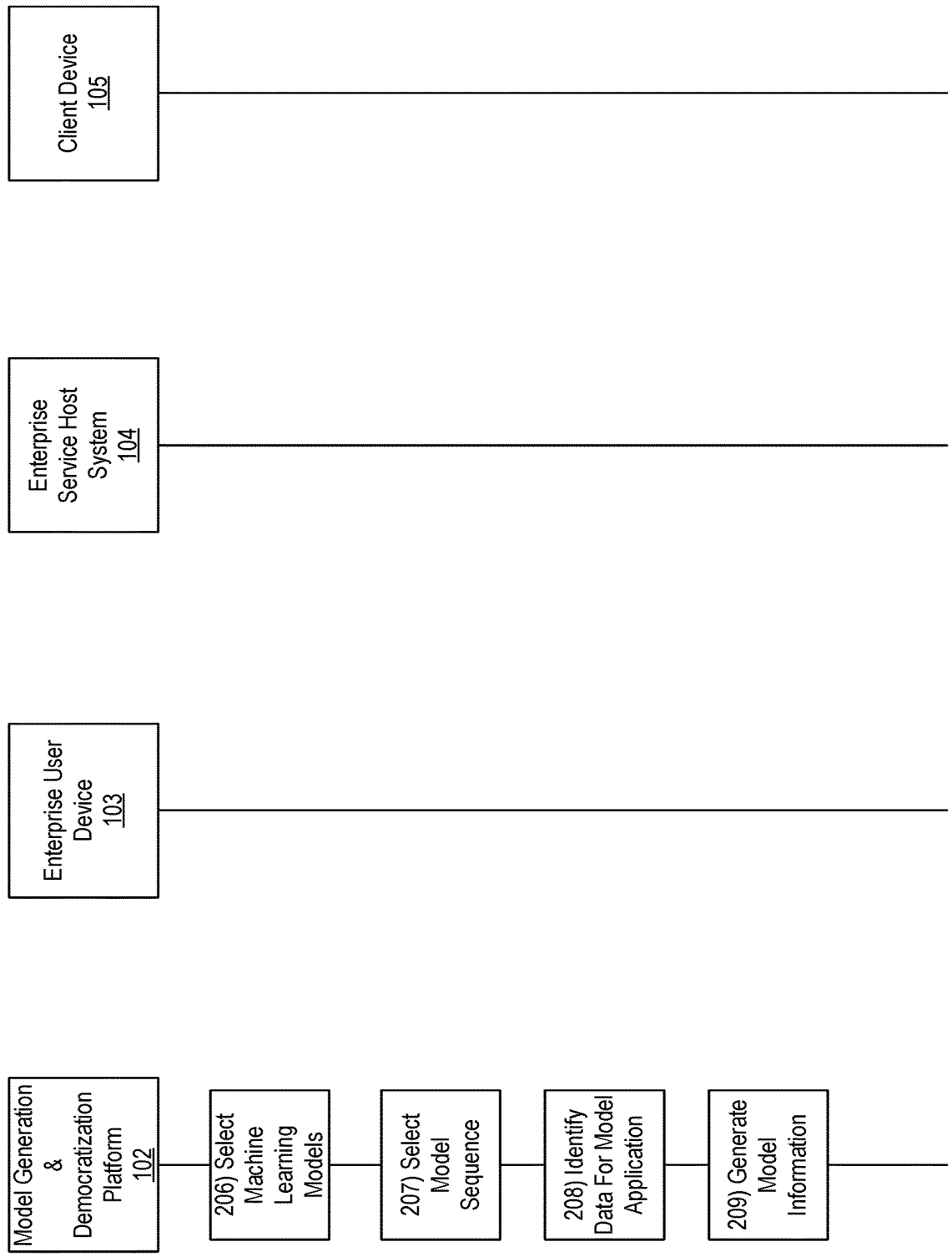

Referring to FIG. 2B, at step 206, the automated model generation platform 102 may select one or more machine learning models based on the features identified at step 205. In one or more instances, the automated model generation platform 102 may implement one or more machine learning algorithms to select the one or more machine learning models. In some instances, rather than applying an unsupervised learning process (as applied at step 205 in feature identification), the automated model generation platform 102 may select the one or more machine learning models using a supervised learning process.

For example, in some instances, the automated model generation platform 102 may have identified key words or topics related to an online banking portal in the model generation request. In these instances, the automated model generation platform 102 may identify models that may be associated with the financial domain. For example, the automated model generation platform 102 may have previously received another model generation request containing key words related to an online banking portal, and may have identified one or more machine learning models to fulfill the request. In this example, the automated model generation platform 102 may have previously stored a correlation between the financial domain and the one or more identified machine learning models (e.g., in the automated model generation database 112b), and may subsequently use the correlation to identify models for the current model generation request. In some instances, however, the automated model generation platform 102 might not have previously stored a correlation between the financial domain and the one or more identified machine learning models, and may thus use a recursive process of supervised learning based on the features identified at step 205 to select the one or more machine learning models.

Additionally or alternatively, the automated model generation platform 102 may have identified a first volume of data associated with the model generation request at step 205, and now may identify one or more machine learning models associated with the first volume of data. For example, the automated model generation platform 102 may have previously received another model generation request associated with the first volume of data, and may have identified one or more machine learning models to fulfill the request. In some instances, the automated model generation platform 102 may identify a second volume of data that is within a predetermined range of the first volume of data and/or within a same threshold volume value range as the first volume of data. In these instances, the automated model generation platform 102 may have previously stored a correlation between the first volume, the predetermined range, and/or the threshold volume value range and one or more machine learning models (e.g., in the automated model generation database 112b), and may subsequently use the correlation to identify models for the current model generation request. In some instances, however, the automated model generation platform 102 might not have previously stored a correlation between the first volume of data and the one or more identified machine learning models, and may thus use a recursive process of supervised learning based on the features identified at step 205 to select the one or more machine learning models.

Similarly, as described above with regard to the key words, topics, and data volumes, the automated model generation platform 102 may use correlations between other features identified at step 205 (e.g., feature intersection, feature commonality, feature similarity, geographic and spatial co-location, time and coincidentality, or the like) and stored correlations between those features and machine learning models to select the one or more machine learning models. In instances where a stored correlation between the identified features and the machine learning models has not previously been stored, the automated model generation platform 102 may use a recursive process of supervised learning to select the one or more machine learning models.

In one or more instances, in selecting the one or more machine learning models, the automated model generation platform 102 may select, for example, one or more of: least square regression, ridge regression, Bayesian method, decision tree, bagging, boosting, random forest, neural network, support vector model, hidden Markov model, or the like. In some instances, these machine learning models may be stored by the automated model generation platform 102 (e.g., in the automated model generation database 112b). Additionally or alternatively, the automated model generation platform 102 may access one or more machine learning models published to one or more web servers (e.g., as part of a manual model building challenge or competition). In these instances, after selecting the one or more machine learning models, the automated model generation platform 102 may store a correlation between the one or more selected machine learning models and the identified problem and/or problem domain from the model generation request.

As a specific example, the automated model generation platform 102 may have determined, through parsing the model generation request at step 205, that the model generation request comprises a request to select one or more machine learning models and a corresponding model application sequence to be applied in the video streaming domain to select targeted content for display as a recommendation. In this example, the automated model generation platform 102 may select, based on features of the streaming video domain and corresponding features of a plurality of machine learning models, boosting, bagging, and random forest as the one or more selected machine learning models.

As yet another example, the automated model generation platform 102 may have determined, through parsing the model generation request at step 205, that the model generation request comprises a request to select one or more machine learning models and a corresponding model application sequence to be applied in the financial domain to select targeted advertisements and/or trading recommendations within an online trading portal. In these examples, the automated model generation platform 102 may select, based on features of the financial domain and corresponding features of a plurality of machine learning models, least square regression, neural network, Bayesian method, and hidden Markov model as the one or more selected machine learning models.

In one or more instances, the automated model generation platform 102 may identify, based on the problem domain (e.g., a service offering) identified, one or more model metrics such as a maximum error rate, a bias metric, a maximum false positive rate, a maximum false negative rate, or the like. In these instances, the automated model generation platform 102 may select the one or more machine learning models based at least in part on the one or more model metrics. For example, by selecting the one or more machine learning models based on such metrics, the automated model generation platform 102 may prevent data from being over fitted and/or under fitted in the models. In some instances, the automated model generation platform 102 may iteratively refine the selected models for a proper level of precision, recall, or the like.

At step 207, the automated model generation platform 102 may select a model application sequence for the one or more machine learning models selected at step 206. For example, the automated model generation platform 102 may determine that, in some instances, a first model application sequence may produce more accurate results for a particular problem and/or problem domain (e.g., the problem and/or problem domain identified from the model generation request at step 206) then a second model application sequence. Accordingly, in these instances, the automated model generation platform 102 may store a correlation between the first model application sequence and the identified problem and/or problem domain.

In one or more instances, the automated model generation platform 102 may select the model application sequence in a similar manner as described above at step 206 with regard to the models themselves. For example, in some instances, the automated model generation platform 102 may identify a stored correlation between a model application sequence and a problem and/or problem domain specified in the model generation request, and may select the model application sequence based on the stored correlation. In contrast, if the automated model generation platform 102 does not have a stored correlation between a model application sequence and a problem and/or problem domain specified in the model generation request, the automated model generation platform 102 may apply unsupervised learning techniques to identify the model application sequence.

To continue with the streaming video example described above, after identifying boosting, bagging, and random forest as the selected machine learning models, at step 207 the automated model generation platform 102 may select from the following model application sequences: 1) boosting, bagging, random forest, 2) boosting, random forest, bagging, 3) bagging, boosting, random forest, 4) bagging, random forest, boosting, 5), random forest, bagging, boosting, and 6) random forest, boosting, bagging. In this instance, the automated model generation platform 102 may select, for example, a model application sequence of boosting, bagging, random forest.

Furthermore, to continue with the trading portal example described above, after identifying least square regression, neural network, Bayesian method, and hidden Markov model as the selected machine learning models, at step 207 the automated model generation platform 102 may select from a plurality of model application sequences that include least square regression, neural network, Bayesian method, and hidden Markov model. In these instances, for example, the automated model generation platform 102 may select a model application sequence of Bayesian method, neural network, hidden Markov model, and least square regression.

In some instances, the automated model generation platform 102 may apply a particular model multiple times in the model application sequence. For example, the automated model generation platform 102 may apply bagging twice to a particular data set. In some instances, the automated model generation platform 102 may determine whether or not to apply a model multiple times based on data volume (e.g., if data volume exceeds a predetermined threshold, apply model a second time, or the like).

At step 208, the automated model generation platform 102 may identify data, associated with the model generation request, to which the one or more selected machine learning models identified at step 206 should be applied in the model application sequence identified at step 207. For example, the automated model generation platform 102 may identify the data based on, for example, the problem and/or problem domain associated with the model generation request.

Specifically, to continue with the examples described above, if the automated model generation platform 102 identifies streaming video as the problem domain, the automated model generation platform 102 may identify that boosting, bagging, and random forest models should be applied, in that order, to data associated with a customer's viewing history, user content ratings, a customer profile (e.g., age, gender, specified interests, or the like), or the like. If the automated model generation platform 102 identified finance as the problem domain, the automated model generation platform 102 may identify that Bayesian method, neural network, hidden Markov model, and least square regression should be applied, in that order, to data associated with a customer's viewing history, stock portfolio, financial risk tolerance, previously executed trades, or the like.

At step 209, the automated model generation platform 102 may generate machine learning model information in response to the model generation request received at step 204. In generating the machine learning model information, the automated model generation platform 102 may generate information indicating the one or more selected machine learning models selected at step 206, the model application sequence identified at step 207, and the data identified for model application at step 208.

In one or more instances, the automated model generation platform 102 may be configured to host a first microservice associated with the problem domain identified in step 205, and may generate the machine learning model information using the first microservice. In these instances, another automated model generation platform may be deployed within the computing environment 100, and this other automated model generation platform may be configured to host a second microservice associated with a second problem domain. For example, the first microservice may be used to generate machine learning model information in a problem domain associated with video streaming services and the second microservice may be used to generate machine learning model information in a problem domain associated with financial services. In other instances, the automated model generation platform 102 may host multiple microservices associated with a single problem domain (e.g., the various microservices may each be associated with a machine learning model, or the like). In some instances, multiple microservices (e.g., the first microservice and the second microservice) may be implemented on different devices within the automated model generation platform 102. Accordingly, by deploying the different microservices on different devices within the automated model generation platform 102, the automated model generation platform 102 may allow the first microservice to remain deployed during modification or downtime of the second microservice, and modification of one microservice might not affect the other. In other instances, multiple microservices (e.g., the first microservice and the second microservice) may be implemented on a common device within the automated model generation platform 102. In some instances, the automated model generation platform 102 may host the first microservice by hosting a script for machine learning model information generation coded in a first programming language, and may host the second microservice by hosting a script for machine learning model information generation coded in a second programming language.

In hosting these various microservices, the automated model generation platform 102 may separate various machine learning components into smaller structures that may be individually selected to generate the machine learning model information. In some instances, each microservice hosted by the automated model generation platform 102 may be flexible, robust, composable, complete, and configured to communicate with other microservices through APIs. Accordingly, in these instances, the automated model generation platform 102 may operate the various microservices in parallel, which may facilitate maintenance of the automated model generation platform 102. Furthermore, by hosting these different microservices, the automated model generation platform 102 may allow various services to be implemented in different programming languages, databases, software environments, or the like, and each service may be may be deployed, rebuilt, and/or managed independently. In these instances, excessive processing load at a single microservice might not affect the entire system hosted by the automated model generation platform 102. Similarly, the automated model generation platform 102 may isolate any problems or failures of individual microservices from the remainder of the system.

Referring to FIG. 2C, at step 210, the automated model generation platform 102 may generate and send a model generation interface to the enterprise user device 103. In one or more instances, the automated model generation platform 102 may send the model generation interface to the enterprise user device 103 via the communication interface and while the first wireless data connection is established. In one or more instances, rather than generating and sending the model generation interface, the automated model generation platform 102 may send the machine learning model information and one or more commands directing the enterprise user device 103 to generate and display a model generation interface based on the machine learning model information.

At step 211, the enterprise user device 103 may receive the model generation interface sent at step 212. In one or more instances, the enterprise user device 103 may receive the model generation interface while the first wireless data connection is established. In one or more instances, rather than receiving the model generation interface, the enterprise user device 103 may receive machine learning model information and one or more commands directing the enterprise user device 103 to generate and display a model generation interface using the machine learning model information.

At step 212, the enterprise user device 103 may generate and/or display the model generation interface. For example, in displaying the model generation interface, the enterprise user device 103 may cause display of a graphical user interface similar to graphical user interface 305, which is shown in FIG. 3. For example, the enterprise user device 103 may display the one or more selected machine learning models in the selected model application sequence. Accordingly, a user of the enterprise user device 103 (e.g., an employee of a financial institution, or the like) may be informed as to the models being applied, and the corresponding order, as applied to a problem domain associated with the enterprise user device 103.

At step 213, after generating the machine learning model information, the automated model generation platform 102 may store the machine learning model information along with an identifier corresponding to the problem and/or problem domain identified at step 205. Accordingly, the automated model generation platform 102 may have a stored correlation between the identified problem domain and the machine learning model information, and may be able to reference the stored correlation to identify an optimal machine learning model combination for generating accurate predictions in various identified problem domains (e.g., as identified in various service access requests). For example, in the event that a service processing request were received at the automated model generation platform 102 indicating a request to access a trading portal and/or a video streaming service, the automated model generation platform 102 may automatically apply a model application sequence of 1) Bayesian method, neural network, hidden Markov model, and least square regression, or 2) boosting, bagging, and random forest, respectively, to the data identified at step 208 (e.g., a customer's viewing history, user content ratings, a customer profile (e.g., age, gender, specified interests, or the like), or the like for video streaming and customer's viewing history, stock portfolio, financial risk tolerance, previously executed trades, or the like for trading).

It should be understood that steps 201-213 may be recursively repeated to generate and store a plurality of model correlations. Accordingly, the automated model generation platform 102 may be able to subsequently access machine learning model information for a plurality of problems and/or problem domains, without having to repeat the iterative process of model and model application sequences described above. In some instances, as additional data or information is received for a given problem and/or problem domain, the automated model generation platform 102 may dynamically update, based on the additional data, the one or more machine learning models and the corresponding model application sequence for the given problem or problem domain, which may result in updated machine learning model information. In these instances, automated model generation platform 102 may replace the stored machine learning model information (e.g., from step 213) with the updated machine learning model information (e.g., so that the updated machine learning model information is stored along with the corresponding indication of the problem and/or problem domain).

At step 214, the client device 105 may receive a service access request. For example, the client device 105 may receive a user input (e.g., from a client or customer of an enterprise service, such as the enterprise service associated with enterprise user device 103) requesting access to a particular service. As a specific example, the client device 105 may receive a user input requesting access to one or more of: an online shopping service, a video streaming and selection service, a music streaming and selection service, a life science service, a medical service, or a financial service.

Figure 2D:
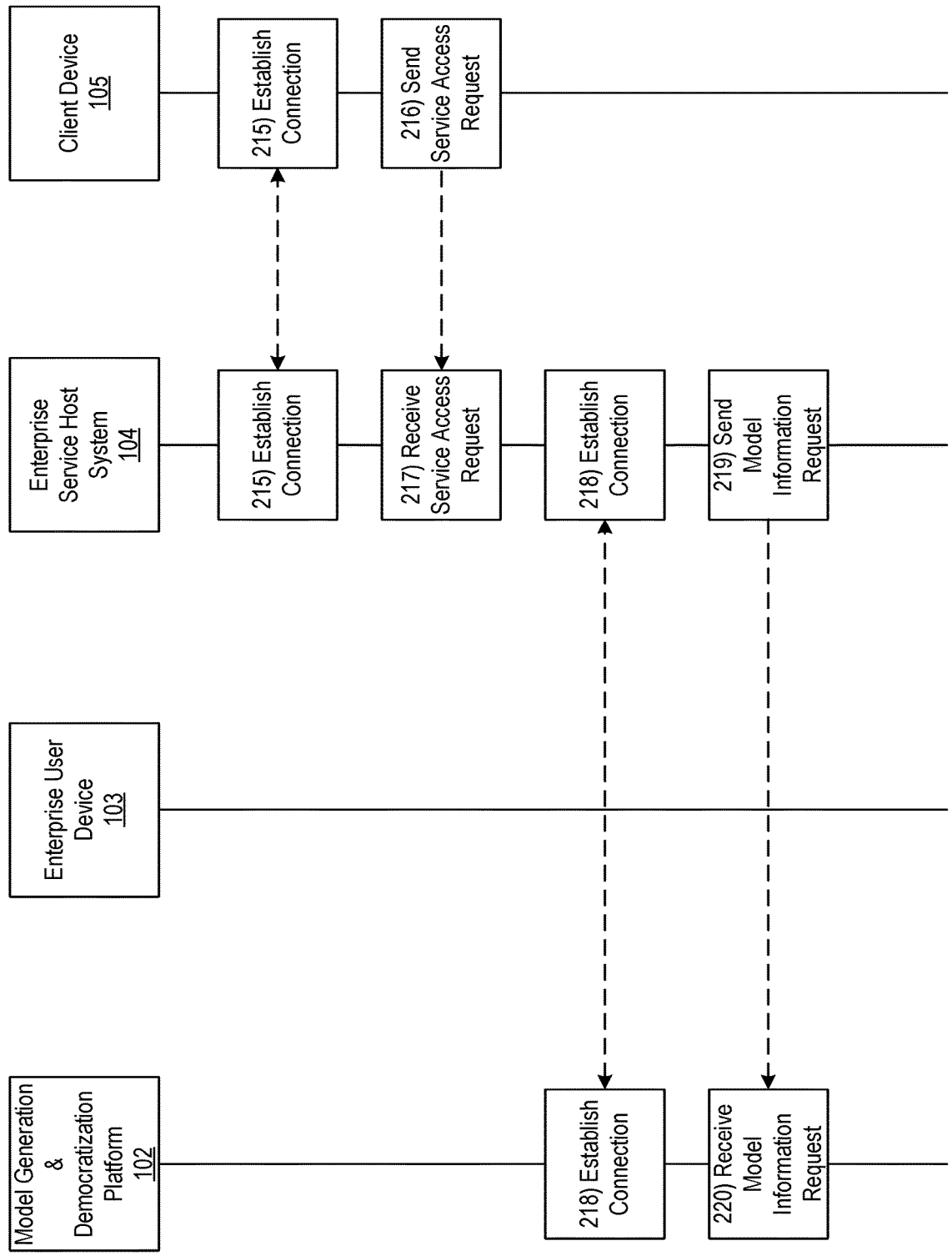

Referring to FIG. 2D, at step 215, the client device 105 may establish a connection with the enterprise service host system 104. In one or more instances, the client device 105 may establish a second wireless data connection with the enterprise service host system 104 to link the client device 105 to the enterprise service host system 104. In some instances, the client device 105 may identify whether or not a connection was previously established with the enterprise service host system 104. If a connection was previously established with the enterprise service host system 104, the client device 105 might not re-establish the connection. If a connection was not previously established with the enterprise service host system 104, the client device 105 may establish the second wireless data connection as described herein.

At step 216, the client device 105 may send, share, or otherwise provide the service access request to the enterprise service host system 104. In one or more instances, the client device 105 may send the service access request to the enterprise service host system 104 while the second wireless data connection is established. For example, the client device 105 may send a request to access the trading portal and/or video streaming service described in the examples above.

At step 217, the enterprise service host system 104 may receive the service access request sent at step 216. In one or more instances, the enterprise service host system 104 may receive the service access request while the second wireless data connection is established. For example, the client device 105 may receive the request to access the trading portal and/or video streaming service sent at step 216. In these instances, the enterprise service host system 104 may be a computing platform configured to host an enterprise service such as the trading portal and/or video streaming service.

At step 218, the enterprise service host system 104 may establish a connection with the automated model generation platform 102. In one or more instances, the enterprise service host system 104 may establish a third wireless data connection with the automated model generation platform 102 to link the enterprise service host system 104 with the automated model generation platform 102. In some instances, the enterprise service host system 104 may identify whether or not a connection is already established with the automated model generation platform 102. If a connection is already established with the automated model generation platform 102, the enterprise service host system 104 might not re-establish the connection. If a connection is not already established with the automated model generation platform 102, the enterprise service host system 104 may establish the third wireless data connection as described herein.

At step 219, the enterprise service host system 104 may generate and send a model information request to the automated model generation platform 102. For example, the enterprise service host system 104 may send a request to the automated model generation platform requesting information indicating which machine learning models should be applied, and a sequence in which they should be applied, to address a particular problem specified in the service access request. To continue with the examples described above, in sending the model information request, the enterprise service host system 104 may send a request for the models and application sequence that should be applied in responding to a request to access a trading portal, video streaming service, or the like. In one or more instances, the enterprise service host system 104 may send the model information request to the automated model generation platform 102 while the third wireless data connection is established.

At step 220, the automated model generation platform 102 may receive the model information request sent at step 219. In some instances, the automated model generation platform 102 may receive the model information request via the communication interface 113 and while the third wireless data connection is established.

Figure 2E:
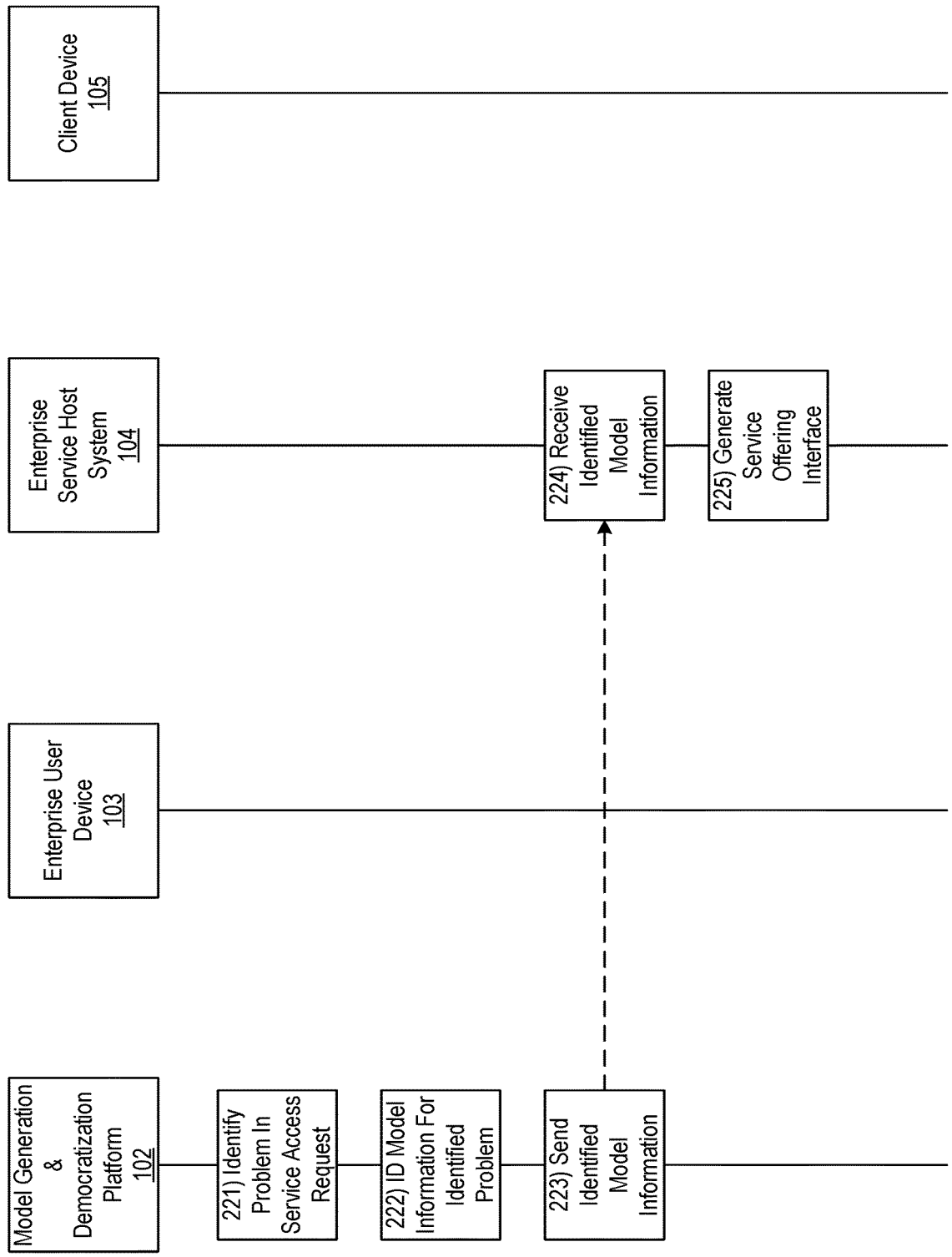

Referring to FIG. 2E, at step 221, the automated model generation platform 102 may identify a particular problem specified in the service access request. For example, the automated model generation platform 102 may parse the model information request, received at step 220, which may include the particular problem. In these examples, the automated model generation platform 102 may identify key words, topics, or the like using, for example, natural language processing algorithms, to identify the particular problem and/or a corresponding problem domain. For example, the automated model generation platform 102 may identify that the service access request is requesting access to a trading platform, video streaming service, or the like.

At step 222, the automated model generation platform 102 may identify machine learning model information associated with the problem identified at step 221. For example, the automated model generation platform 102 may access the correlations stored at step 213 to identify one or more machine learning models and a corresponding application sequence that should be applied in responding to the identified problem. To continue with the examples described above, if the identified problem is to launch a trading portal, the automated model generation platform 102 may access the correlation stored at step 213 indicating that Bayesian method, neural network, hidden Markov model, and least square regression should be applied, in that order, to a viewing history, stock portfolio, financial risk tolerance, previously executed trades, or the like associated with a user of the client device 105. Similarly, if the identified problem is to launch a video streaming service, the automated model generation platform 102 may access the correlation stored at step 213 indicating that boosting, bagging, and random forest should be applied to data associated with a viewing history, user content ratings, a customer profile (e.g., age, gender, specified interests, or the like), or the like associated with the user of the client device 105.

In some instances, the automated model generation platform 102 may be unable to identify machine learning model information for the identified problem and/or problem domain (e.g., because a request to generate such machine learning model information was not previously received). In these instances, the automated model generation platform 102 may return to step 204 to generate machine learning model information for the identified problem and/or problem domain.

At step 223, the automated model generation platform 102 may send the machine learning model information, identified at step 222, to the enterprise service host system 104. In one or more instances, the automated model generation platform 102 may send the machine learning model information to the enterprise service host system 104 via the communication interface 113 and while the third wireless data connection is established. In one or more instances, the automated model generation platform 102 may send the machine learning model information to the enterprise service host system in response to identifying that the problem identified in the service access request corresponds to a problem domain for which a correlation is stored. For example, the automated model generation platform 102 may send a message to the enterprise service host system 104, in response to a model information request corresponding to a problem of launching an online trading portal, indicating that Bayesian method, neural network, hidden Markov model, and least square regression should be applied, in that order, to a viewing history, stock portfolio, financial risk tolerance, previously executed trades, or the like associated with a user of the client device 105. Similarly, if the identified problem is to launch a video streaming service, the automated model generation platform 102 may send a message to the enterprise service host system 104 indicating that boosting, bagging, and random forest should be applied to data associated with a viewing history, user content ratings, a customer profile (e.g., age, gender, specified interests, or the like), or the like associated with the user of the client device 105.

For example, in applying boosting to the data, the enterprise service host system 104 may iteratively learn weak classifiers with respect to a distribution and add them to a final strong classifier. In this example, when the weak classifiers are added by the enterprise service host system 104, they may be weighted in a way that is related to accuracy of the weak classifiers. Furthermore, in this example, the enterprise service host system 104 may re-weight the data say as to increase weight of misclassified input data and reduce weight of correctly classified input data. In doing so, the enterprise service host system may reduce bias and variance.

In applying bagging to the data, the enterprise service host system 104 may generate new training sets based on an initial training set by sampling from the initial training set uniformly and with replacement. In this example, the enterprise service host system 104 may then fit models using the new training sets and combine the models by averaging output for regression, voting for classification, or the like. By doing so, the enterprise service host system 104 may improve stability and accuracy of machine learning algorithms being applied, reduce variance, and help to avoid overfitting.

In applying random forest to the data, the enterprise service host system 104 may construct one or more decision trees at training time and output a class that is a mode of the classes, mean prediction of the individual trees, or the like. In doing so, the enterprise service host system 104 may correct for decision trees' habit of overfitting to a training set.

In one or more instances, in addition to or as an alternative to sending the machine learning model information, the automated model generation platform 102 may generate a service offering interface (which is described further below with regard to FIG. 4), and may send the service offering interface to the enterprise service host system 104. In some instances, rather than generating the service offering interface, the automated model generation platform 102 may generate and send one or more commands directing the enterprise service host system 104 to generate the service offering interface using the machine learning model information.

At step 224, the enterprise service host system 104 may receive the machine learning model information sent at step 223. In one or more instances, the enterprise service host system 104 may receive the machine learning model information while the third wireless data connection is established.

In one or more instances, in addition to or as an alternative to receiving the machine learning model information, the enterprise service host system 104 may receive a service offering interface. In some instances, rather than receiving the service offering interface, the enterprise service host system 104 may receive the one or more commands directing the enterprise service host system 104 to generate a service offering interface using the machine learning model information.

At step 225, the enterprise service host system 104 may generate a service offering interface using the machine learning model information. In one or more instances, the enterprise service host system 104 may generate the service offering interface in response to receiving the one or more commands directing the enterprise service host system 104 to generate the service offering interface. For example, in generating the service offering interface, the enterprise service host system 104 may apply the one or more machine learning models, identified in the machine learning model information, in the model application sequence specified in the machine learning model information, to the data specified in the machine learning model information.

Specifically, in continuing with the examples described above, with regard to launching an online trading portal, the enterprise service host system 104 may apply Bayesian method, neural network, hidden Markov model, and least square regression, in that order, to a viewing history, stock portfolio, financial risk tolerance, previously executed trades, or the like associated with a user of the client device 105. Similarly, in the context of launching a video streaming service, the enterprise service host system 104 may apply boosting, bagging, and random forest, in that order, to a viewing history, user content ratings, a customer profile (e.g., age, gender, specified interests, or the like), or the like associated with the user of the client device 105. Alternatively, rather than generating the service offering interface, the enterprise service host system 104 may generate one or more commands directing the client device 105 to generate the service offering interface.

At step 226, the enterprise service host system 104 may send the service offering interface, generated at step 225, to the client device 105. In one or more instances, rather than sending the service offering interface, the enterprise service host system 104 may send the machine learning model information and one or more commands directing the client device 105 to generate the service offering interface using the machine learning model information. In some instances, the enterprise service host system 104 may send the service offering interface to the client device 105 while the second wireless data connection is established.

At step 227, client device 105 may receive the service offering interface, sent at step 226. In one or more instances, rather than receiving the service offering interface, the client device 105 may receive the machine learning model information and one or more commands directing the client device 105 to generate the service offering interface using the machine learning model information. In these instances, in response to receiving the one or more commands directing the client device 105 to generate the service offering interface using the machine learning model information, the client device 105 may generate the service offering interface using the machine learning model information.

At step 228, the client device 105 may display the service offering interface, received at step 228. In one or more instances, in displaying the service offering interface, the client device 105 may display a graphical user interface similar to graphical user interface 405, which is shown in FIG. 4. For example, the client device 105 may display a graphical user interface that includes predictions and/or recommendations in response to the service access request. For example, the client device 105 may display a graphical user interface that includes targeted movie recommendations, trades, advertisements, or the like.

Although steps 201-228 are primarily described with regard to a single automated model generation platform 102, enterprise user device 103, enterprise service host system 104, and client device 105, it should be understood that any number of data sources and/or user devices may be implemented in alternative arrangements of the methods described herein. Similarly, although one or more of the systems and methods described herein are primarily illustrated in the context of streaming video content and trading platforms, in should be understood that these systems and methods may be described to any number of alternative industries and/or in alternative use cases, such as, for example, an online shopping service, an alternative content streaming and selection service, a music streaming and selection service, a life science service, a medical service, a corporate service, a different financial service, or the like.

Figure 5:
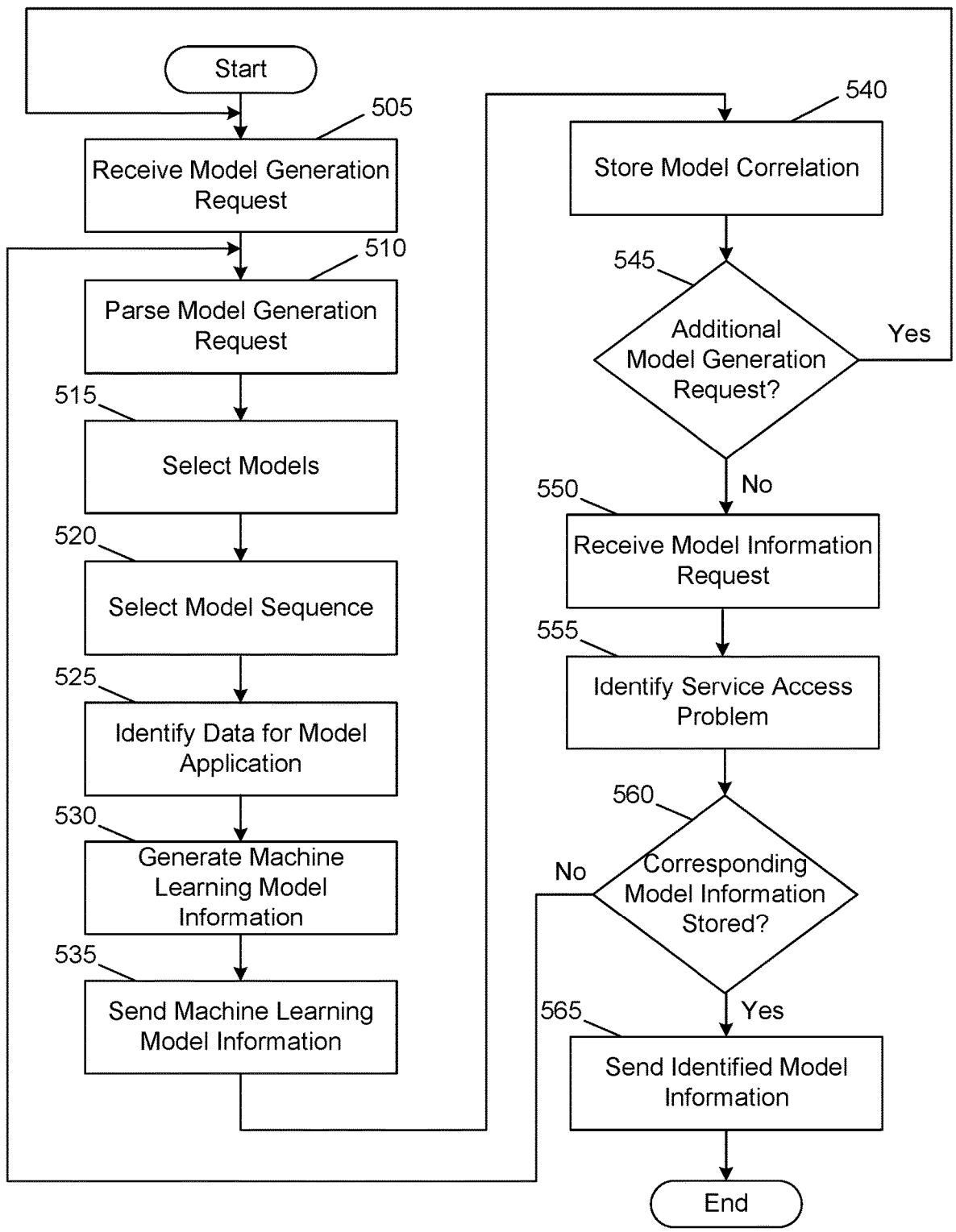
FIG. 5 depicts an illustrative method for implementing an automated model generation platform for recursive model building in accordance with one or more example embodiments.

FIG. 5 depicts an illustrative method implemented by an automated model generation platform for recursive model building in accordance with one or more example embodiments. Referring to FIG. 5, at step 505, a computing platform having at least one processor, a communication interface, and memory may receive a request to generate one or more machine learning models. At step 510, the computing platform may parse the request to generate the one or more machine learning models to identify a problem domain associated with the request to generate the one or more machine learning models. At step 515, the computing platform may select one or more machine learning models based on features of the identified problem domain and the one or more machine learning models. At step 520, the computing platform may select a model application sequence based on features of the identified problem domain and the one or more machine learning models. At step 525, the computing platform may identify data to which the one or more selected machine learning models should be applied in the model application sequence. At step, 530 the computing platform may generate machine learning model information that includes the one or more selected machine learning models, the model application sequence, and the identified data. At step 535, the computing platform may send the machine learning model information to an enterprise user device for display. At step 540, the computing platform may store a correlation between the identified problem domain and the machine learning model information. At step 545, the computing platform may determine whether an additional model generation request has been received. If an additional model generation request has been received, the computing platform may return to step 505. If an additional model generation request has not been received, the computing platform may proceed to step 550.

At step 550, the computing platform may receive a request for machine learning model information corresponding to a service access request. At step 555, the computing platform may identify a specified problem and/or problem domain associated with the service access request. At step 560, the computing platform may determine whether machine learning model information corresponding to the specified problem and/or problem domain is stored. If corresponding machine learning model information is not stored for the specified problem, the computing platform may return to step 510 to identify the machine learning model information. If machine learning model information is stored for the specified problem, the computing platform may proceed to step 565. At step 565, the computing platform may send the identified machine learning model information to an enterprise service host system for use in generating a solution and/or user interface in response to the service access request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive a request for automated machine learning model building;
      identify a service offering corresponding to the automated machine learning model building request;
      select, based on the identified service offering and using one or more machine learning algorithms, one or more machine learning models and a corresponding sequence of model application, resulting in machine learning model information, wherein the corresponding sequence of model application indicates an order in which the one or more machine learning models should be applied, and wherein:
         the one or more machine learning models include bagging, and wherein performing the bagging comprises:
            generating new training data sets by sampling an initial training data set uniformly with replacement, and
            fitting the one or more machine learning models using the new training data sets, wherein the bagging improves stability and accuracy of the one or more machine learning models, reduces variance, and avoids overfitting;
      store the machine learning model information along with a corresponding indication of the identified service offering;
      receive, from an enterprise service host system, a request for model information corresponding to a service access request;
      identify that the service access request corresponds to a problem within the identified service offering; and
      in response to identifying that the service access request corresponds to the problem within the identified service offering, send, to the enterprise service host system, the machine learning model information, wherein sending the machine learning model information to the enterprise service host system causes the enterprise service host system to generate a service output interface by applying the machine learning model information to the problem associated with the service access request, wherein applying the machine learning model information comprises applying the selected one or more machine learning models in the order in which the one or more machine learning model should be applied.

2. The computing platform of claim 1, wherein selecting the one or more machine learning models and the corresponding sequence of model application comprises selecting the one or more machine learning models and the corresponding sequence of model application based on model features include one or more of: key words associated with the problem, topics associated with the problem, a volume of data associated with the problem, set of features similarity between models, geographic and spatial co-location of the data associated with the problem, or time and coincidentally of the data associated with the problem.

3. The computing platform of claim 2, wherein:
   the model features are identified using an unsupervised learning process; and
   selecting the one or more machine learning models and the corresponding sequence of model application comprises generating the one or more machine learning models using a supervised learning process.

4. The computing platform of claim 1, wherein the memory stores additional computer-readable instructions that, when executed by the at least one processor, further cause the computing platform to:
   identify, based on the service offering, one or more model metrics, wherein:
      the metrics comprise one or more of a maximum error rate, a bias metric, a maximum false positive rate, or a maximum false negative rate, and
      selecting the one or more machine learning models and the corresponding sequence of model application is based on the one or more model metrics.

5. The computing platform of claim 1, wherein selecting the one or more machine learning models comprises selecting one or more of:
   least square regression, ridge regression, Bayesian method, decision tree, bagging, boosting, random forest, neural network, support vector model, or hidden Markov model.

6. The computing platform of claim 1, wherein the identified service offering comprises one of: an online shopping service, a video streaming and selection service, a music streaming and selection service, a life science service, a medical service, or a financial service.

7. The computing platform of claim 1, wherein the memory stores additional computer-readable instructions that, when executed by the at least one processor, further cause the computing platform to:
receive additional data associated with the service offering;
dynamically update, based on the additional data, the one or more machine learning models and the corresponding sequence of model application, resulting in updated machine learning model information; and
replace the stored machine learning model information with the updated machine learning model information, wherein the updated machine learning model information is stored along with the corresponding indication of the identified service offering.

8. The computing platform of claim 1, wherein the memory stores additional computer-readable instructions that, when executed by the at least one processor, further cause the computing platform to:
host a first microservice associated with a first one of the one or more machine learning models, wherein selecting the one or more machine learning models and the corresponding sequence of model application, is performed using the first microservice, and wherein:
another computing platform is configured to host a second microservice, associated with a second one of the one or more machine learning models, wherein the other computing platform uses the second microservice to select one or more additional machine learning models and a corresponding application sequence for the one or more additional machine learning models.

9. The computing platform of claim 8, wherein:
the first microservice is implemented in a first programming language; and
the second microservice is implemented in a second programming language.

10. The computing platform of claim 8, wherein:
the first microservice remains deployed during modification of the second microservice; and
the modification of the second microservice does not affect the first microservice.

11. The computing platform of claim 1, wherein identifying the service offering corresponding to the automated machine learning model building request comprises identifying a problem domain corresponding to a machine learning model democratization request.

12. A method comprising:
at a computing platform comprising at least one processor, a communication interface, and memory:
receiving a request for automated machine learning model building;
identifying a service offering corresponding to the automated machine learning model building request;
selecting, based on the identified service offering and using one or more machine learning algorithms, one or more machine learning models and a corresponding sequence of model application, resulting in machine learning model information, wherein the corresponding sequence of model application indicates an order in which the one or more machine learning models should be applied, and wherein:
the one or more machine learning models include bagging, and wherein performing the bagging comprises:
generating new training data sets by sampling an initial training data set uniformly with replacement, and
fitting the one or more machine learning models using the new training data sets, wherein the bagging improves stability and accuracy of the one or more machine learning models, reduces variance, and avoids overfitting;
storing the machine learning model information along with a corresponding indication of the identified service offering;
receiving, from an enterprise service host system, a request for model information corresponding to a service access request;
identifying that the service access request corresponds to a problem within the identified service offering; and
in response to identifying that the service access request corresponds to the problem within the identified service offering, sending, to the enterprise service host system, the machine learning model information, wherein sending the machine learning model information to the enterprise service host system causes the enterprise service host system to generate a service output interface by applying the machine learning model information to the problem associated with the service access request, wherein applying the machine learning model information comprises applying the selected one or more machine learning models in the order in which the one or more machine learning model should be applied.

13. The method of claim 12, wherein selecting the one or more machine learning models and the corresponding sequence of model application comprises selecting the one or more machine learning models and the corresponding sequence of model application based on model features including one or more of: key words associated with the problem, topics associated with the problem, a volume of data associated with the problem, set of features similarity between models, geographic and spatial co-location of the data associated with the problem, or time and coincidentally of the data associated with the problem.

14. The method of claim 13, wherein:
the model features are identified using an unsupervised learning process; and
selecting the one or more machine learning models and the corresponding sequence of model application comprises generating the one or more machine learning models using a supervised learning process.

15. The method of claim 12, further comprising:
identifying, based on the service offering, one or more model metrics, wherein:
the metrics comprise one or more of a maximum error rate, a bias metric, a maximum false positive rate, or a maximum false negative rate, and
selecting the one or more machine learning models and the corresponding sequence of model application is based on the one or more model metrics.

16. One or more non-transitory computer-readable media storing instructions that, when executed by a computing platform comprising at least one processor, a communication interface, and memory, cause the computing platform to:

receive a request for automated machine learning model building;
identify a service offering corresponding to the automated machine learning model building request;
select, based on the identified service offering and using one or more machine learning algorithms, one or more machine learning models and a corresponding sequence of model application, resulting in machine learning model information, wherein the corresponding sequence of model application indicates an order in which the one or more machine learning models should be applied, and wherein:
  the one or more machine learning models include bagging, and wherein performing the bagging comprises:
    generating new training data sets by sampling an initial training data set uniformly with replacement, and
    fitting the one or more machine learning models using the new training data sets, wherein the bagging improves stability and accuracy of the one or more machine learning models, reduces variance, and avoids overfitting;
store the machine learning model information along with a corresponding indication of the identified service offering;
receive, from an enterprise service host system, a request for model information corresponding to a service access request;
identify that the service access request corresponds to a problem within the identified service offering; and
in response to identifying that the service access request corresponds to the problem within the identified service offering, send, to the enterprise service host system, the machine learning model information, wherein sending the machine learning model information to the enterprise service host system causes the enterprise service host system to generate a service output interface by applying the machine learning model information to the problem associated with the service access request, wherein applying the machine learning model information comprises applying the selected one or more machine learning models in the order in which the one or more machine learning model should be applied.

17. The computing platform of claim 1, wherein the order in which the one or more machine learning models should be applied is selected by identifying a stored correlation between the request for the automated machine learning building and the order.

18. The computing platform of claim 1, wherein applying the one or more machine learning models in the order in which the one or more machine learning models should be applied yields more accurate results than application of the one or more machine learning models in a different order.

19. The computing platform of claim 1, wherein the order in which the one or more machine learning models should be applied comprises: 1) boosting, 2) bagging, and 3) random forest.

20. The computing platform of claim 1, wherein the order in which the one or more machine learning models should be applied includes application of at least one of the one or more machine learning models multiple times within the order, wherein identifying that the at least one of the one or more machine learning models should be applied multiple times is based on:
  identifying that data volume exceeds a predetermined threshold, and
  a rule corresponding to the predetermined threshold, wherein the rule indicates that the at least one of the one or more machine learning models should be applied multiple times if the data volume exceeds the predetermined threshold.

* * * * *